United States Patent [19]

Paul et al.

[11] Patent Number: 5,183,112
[45] Date of Patent: * Feb. 2, 1993

[54] METHOD FOR SCALE REMOVAL IN A WELLBORE

[75] Inventors: James M. Paul, Dallas; Richard L. Morris, Duncanville, both of Tex.

[73] Assignee: Mobil Oil Corporation, Fairfax, Va.

[*] Notice: The portion of the term of this patent subsequent to Dec. 25, 2007 has been disclaimed.

[21] Appl. No.: 745,779

[22] Filed: Aug. 16, 1991

[51] Int. Cl.$^5$ ............................................. E21B 33/02
[52] U.S. Cl. ................. 166/312; 166/305.1; 166/309; 166/311
[58] Field of Search ...................... 166/305.1, 311, 312, 166/313, 371, 309; 252/8.552; 134/3

[56] References Cited

U.S. PATENT DOCUMENTS

| | | | |
|---|---|---|---|
| 1,809,546 | 6/1931 | Bowman | 106/312 |
| 2,877,848 | 3/1959 | Case | 166/305.1 |
| 2,933,137 | 4/1960 | D'Audiffret et al. | 166/312 |
| 3,660,287 | 5/1972 | Quattrini | 166/311 X |
| 3,688,829 | 9/1972 | Jones | 166/312 X |
| 3,696,040 | 10/1972 | Mayo | 166/312 X |
| 3,722,594 | 3/1973 | Smith et al. | 166/311 X |
| 3,729,054 | 4/1973 | Yokoyama | 166/312 |
| 4,681,164 | 7/1987 | Stacks | 166/312 X |
| 4,980,077 | 12/1990 | Morris et al. | 166/312 X |
| 5,084,105 | 1/1992 | Morris et al. | 134/3 |

OTHER PUBLICATIONS

Bossler, Robert B. et al., "Chemical and Mechanical Treatment of Water-Input Wells", *Secondary Recovery of Oil in the United States*, Pub. by API, 2nd Ed. 1950, pp. 363-369.

*Primary Examiner*—George A. Suchfield
*Attorney, Agent, or Firm*—Alexander J. McKillop; George W. Hager, Jr.; Lawrence O. Miller

[57] ABSTRACT

Alkaline earth metal scales, especially barium sulfate scale is removed from a well (the wellbore and the adjacent formation) by contacting the scale with a scale-removing solvent and thereafter sparging the solvent with air or insert gas to dissolve the scale. The sparging aids in achieving a flushing action by the solvent relative to the scale thereby enabling the solvent to more effectively dissolve the scale in the well. Temperature and caustic compatible surfactuants (anionic and non-ionic) may be used in the solvent to generate a column of foam which increases the extent of cleaning oil from the scale surfaces, enabling the solvent to more effectively remove the scale.

10 Claims, 1 Drawing Sheet

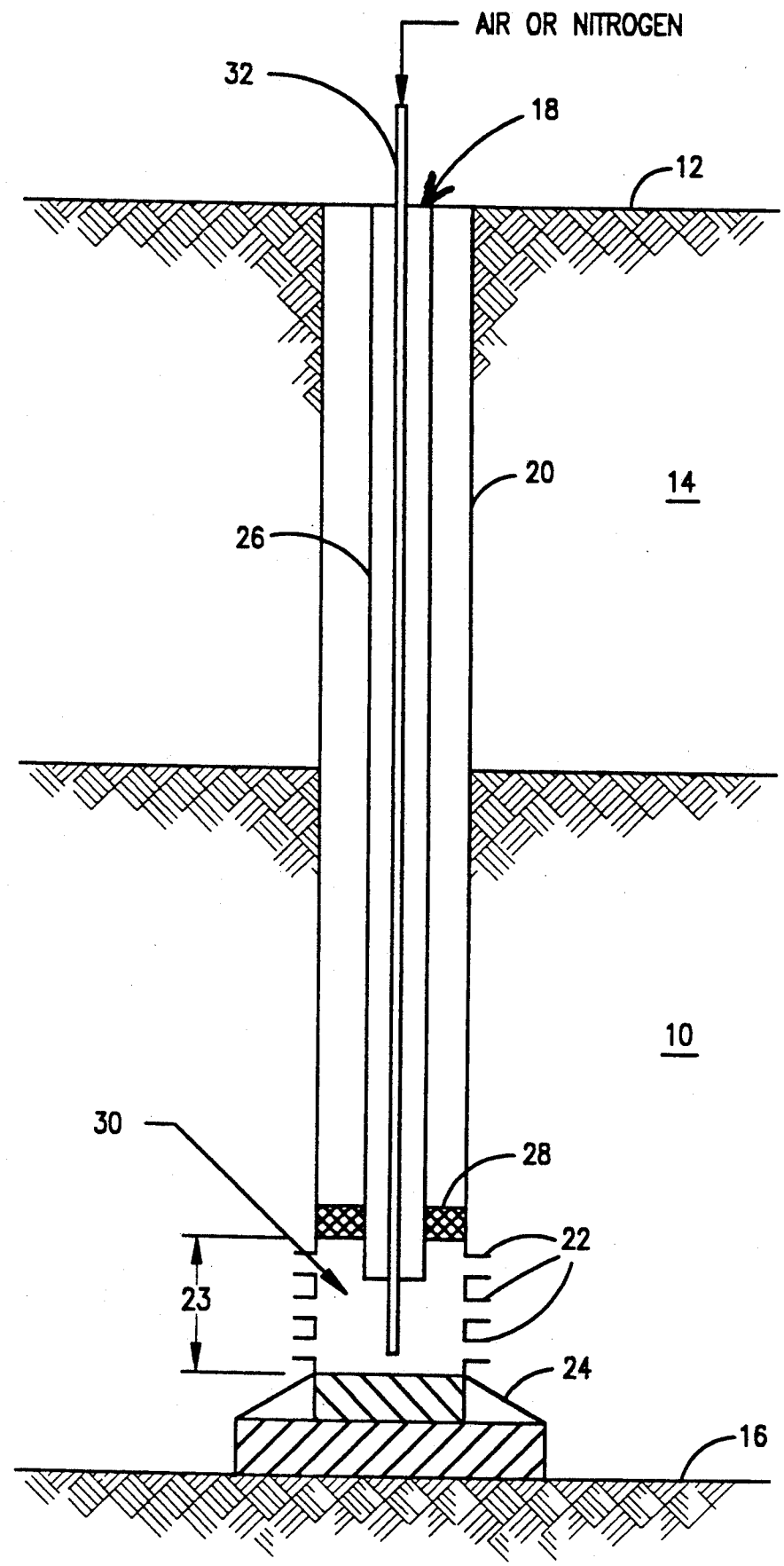

METHOD FOR SCALE REMOVAL IN A WELLBORE

CROSS REFERENCE TO RELATED APPLICATIONS

This application is related to prior co-pending application Ser. No. 07/332,147, now U.S. Pat. No. 5,093,020, filed Apr. 3, 1989, of J.M. Paul and R.L. Morris; Ser. No. 07/369,897, filed Jun. 22, 1989, now U.S. Pat. No. 4,980,077 granted Dec. 25, 1990, of J.M. Paul and R.L. Morris; Ser. No. 07/431,114, now U.S. Pat. No. 5,084,105, filed Nov. 3, 1989, of J.M. Paul and R.L. Morris; Ser. No. 07/484,970, now abandoned filed Feb. 24, 1990, of J.M. Paul and R.L. Morris; and Ser. No. 07/612,728, now U.S. Pat. No. 5,087,371 filed Nov. 14, 1990, of J.M. Paul and R.L. Morris.

FIELD OF THE INVENTION

This invention relates to a method of removing barium sulfate and other sulfate scale deposits from a well (the wellbore and the adjacent formation) by injecting a scale-removing solvent into the well and thereafter sparging the solvent with air or an inert gas to agitate the solvent thereby enabling the scale solvent to more effectively dissolve the scale deposits.

BACKGROUND OF THE INVENTION

Many waters contain alkaline earth metal cations, such as barium, strontium, calcium, magnesium, and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water system, in production systems for oil and gas, in pulp and paper mill systems, and in other systems, causing delays and shutdowns for cleaning and removal.

In the co-pending applications reference above, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates; or (3) thiosulfates. The scale is removed under alkaline conditions, preferably at pH values of at least 10, usually 10–14, with best results being achieved at about pH 12. When the solvent becomes saturated with scale metal cations, the spent solvent is disposed of by re-injection into the subsurface formation or regenerated.

It is common practice when using scale dissolvers to pump a slug or volume of solvent into the well and leave it to stand static for a long period of time. This is not effective from an economic stand point because the well must be shut in for long periods of time, resulting in loss of production. Soaking is also not an efficient method from a reaction rate stand point. Also, circulating scale solvent into the well bore is too costly, due to the large volume of solvent needed to fill the tubing and allow circulation.

This invention provides an effective method for removing scale from a well by contacting the scale with a scale-removing solvent and sparging the solvent with air or inert gas to achieve a flushing action by the solvent relative to the scale thereby enabling the solvent to more effectively dissolve the scale in the well.

SUMMARY OF THE INVENTION

A method for removing alkaline earth sulfate scale from a well (the wellbore and the adjacent formation) comprising contacting the scale with a scale-removing solvent and sparging the solvent with air or an inert gas to dissolve the scale.

DESCRIPTION OF THE DRAWING

The Figure schematically illustrates a method in accordance with this invention in which scale solvent is injected into the production interval of a production well and thereafter sparging air or inert gas into the scale solvent through small diameter tubing.

DESCRIPTION OF THE PREFERRED EMBODIMENTS

In accordance with the present invention, a subterranean formation is penetrated by a wellbore, including a casing in fluid communication therewith by means of well casing perforations in the zone of the formation. Production occurs from the formation by the flow of fluids including oil, gas and water through the perforations into the wellbore with the fluids then being recovered. The production of fluids from the well can be inhibited by the formation of scale which plugs or partially plugs perforations in the casing of the wellbore, tubing inside the casing, downhole equipment such as pumps and safety valves or the formation near the well.

The present invention removes the scale deposits from the well (the wellbore and the adjacent formation) with a scale-removing solvent comprising a chelating agent and a catalyst or synergist to speed up the dissolution of the scale as disclosed in U.S. Pat. No. 4,980,077 which issued on Dec. 25, 1990 to J.M. Paul and R.L. Morris. This patent is hereby incorporated by reference. The pH of the solvent is maintained at pH values of about 8.0 to about 14.0, preferably at about 11 to 13, preferably about 12, with the addition of potassium hydroxide (caustic potash). Suitable chelating agents comprise polyaminopolycarboxylic acid such as EDTA or DTPA. The chelant may be added to the solvent in the acid form or, alternatively, as a salt of the acid, preferably the potassium salt. In any event the alkaline conditions used in the scale removal process will convert the free acid to the salt.

The concentration of the chelant in the solvent should normally be at least 0.1M in order to achieve acceptable degree of scale removal. The catalyst or synergist comprise anions of at least one monocarboxylic acid such as mercaptoacetic acid, aminoacetic acid and hydroxyacetic acid; oxalates, and/or thiosulfates.

The concentration of the catalyst or synergist in the aqueous solvent will be of a similar order: thus, the amount of the oxalate anion in the solvent should normally be at least 0.1M in order to achieve a perceptible increase in the efficiency of the scale removal, and concentrations from about 0.3M up to about 0.6M will give good results. The scale solvent may also contain caustic compatible anion and non-ionic surfactants. Suitable surfactants are selected from the group consisting of sodium tetradecyl sulfate sold under the trade designation "NIAPROOF NAS4" by Niacet Corporation, sodium 2-ethylhexyl sulfate sold under the trade designation "NIAPROOF NASO8" by Niacet Corporation and ethyoxy sulfates sold under the trade designation "NEODOL 25-3S" by Shell Chemical Company. The concentration of the surfactants in the aqueous solvent will be sufficient to generate a stable foam.

In the Figure, an oil-containing formation 10 is situated below the earth's surface 12 covered by overburden 14 and supported by strata 16.

Formation 10 is penetrated by a production well 18 equipped with casing 20 and is provided with perforations 22 in the productive interval 23 of the formation. The bottom of the casing 20 is sealed by means of casing shoe 24. The production well 18 is equipped with tubing 26 which extends downwardly from the top of the well through packer 2 which insures that oil produced from the formation enters the production tubing 26. Tubing 26 terminates adjacent the lower perforations 22. During production of fluid including oil from the formation, fluid enters the casing 20 through perforations 22 and the produced fluid is conducted to the earth's surface 12 through tubing 26 and finally is conveyed to a suitable hydrocarbon recovery facility. During production of fluids, alkaline earth metal scales' especially barium sulfate scale, deposits in the perforations 22 which plugs or partially plugs the perforations thereby interfering with the flow of production fluids.

Once scale deposits result in the loss of production fluids from the well 18, the production well is shut in. Thereafter, a slug or predetermined volume of scale-removing solvent is injected via tubing 26 into zone 30 of the well 18 containing scale deposits located downhole below packer 28 and adjacent the productive interval 23 The amount of scale solvent injected into zone 30 will depend upon the amount of scale deposits in the casing and downhole equipment. Prior to being injected into the well 18, the solvent may be heated to a temperature between about 25° C. to about 100° C., although the prevailing downhole temperature may make preheating unnecessary. Thereafter, the scale solvent is sparged with air or an inert gas by injecting air or an inert gas through small diameter coiled tubing 32 which extends into the scale solvent in zone 30. The injected raw or inert gas bubbles through the scale-removing solvent creating a flushing action by the solvent relative to the scale thereby enabling the solvent to more effectively dissolve the scale which has fouled the down hole tubular equipment, e.g., piping, casing, etc., and passage ways adjacent the formation. Sparging is continued and the solvent is kept in contact with the surfaces and perforations 22 adjacent the formation in zone 30 that ar covered with scale for a period of time sufficient to dissolve the scale. The surfactants (anionic and non-ionic) in the solvent generate a column of foam which increases the extent of cleaning the perforations and downhole equipment. Additionally, the surfactants clean oil from the scale surfaces, enabling the solvent to more effectively remove the scale. After remaining in contact with the equipment in zone 30 for the desired time the solvent containing the dissolved scale is produced to the surface and the well may then be returned to productive use. This procedure can be repeated as often as required to remove scale from the equipment in the well and adjacent the formation.

What is claimed is:

1. A method for removing alkaline earth scale within a well including the adjacent formation comprising contacting the scale within the well with a scale-removing solvent comprising an aqueous solution having a pH of about 10 to about 14 and comprising a chelating agent comprising a polycarboxylic acid or salt of such an acid and a synergist anion to dissolve the scale, the improvement comprising sparging the solvent with air or an inert gas to more effectively dissolve the scale.

2. A method according to claim 1 wherein the chelating agent comprises DTPA.

3. A method according to claim 1 wherein the chelating agent comprises EDTA.

4. A method according to claim 1 wherein the scale consists of barium, strantum or calcium sulfate and mixtures thereof and naturally occurring radioactive material mainly radium 226 and radium 228.

5. A method according to claim 1 wherein the synergist comprises a monocarboxylic acid.

6. A method according to claim 5 in which the monocarboxylic acid is salicylic acid or a substituted acetic acid.

7. A method according to claim 1 wherein the synergist is oxalate.

8. A method according to claim 1 wherein the solvent contains a caustic surfactant (anionic and non-ionic) comprising sodium tetradecyl sulfate, sodium 2-ethylhexyl sulfate and ethoxy sulfate.

9. A method according to claim 1 wherein the sparging air or inert gas is injected into the scale solvent via small diameter tubing.

10. A method according to claim 1 where the solvent is directed down the well, sparged with air or an inert gas to dissolve the scale in the well, and subsequently dissolved scale is removed from the well.

* * * * *